Jan. 4, 1966  V. SMEJKAL ETAL  3,227,042
PROJECTION OBJECTIVE OF CONTINUOUSLY VARIABLE FOCAL LENGTH
Filed Oct. 12, 1962
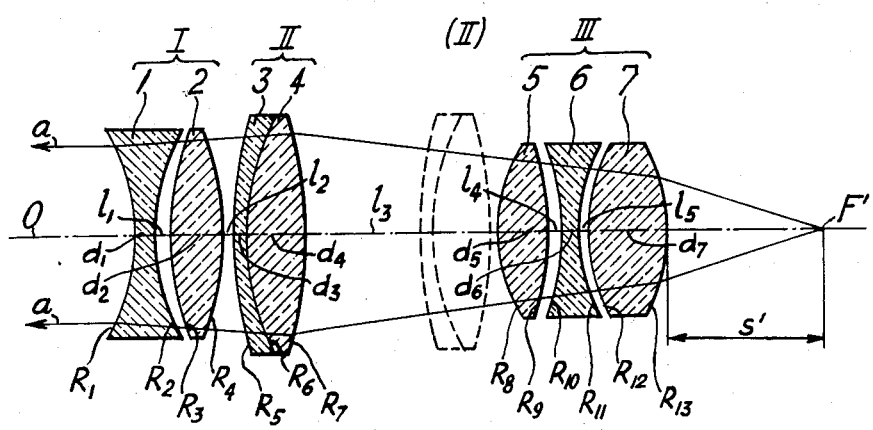
INVENTORS
Vilém Smejkal, Ladislav Pospíšil United States Patent Office 3,227,042
Patented Jan. 4, 1966

3,227,042
PROJECTION OBJECTIVE OF CONTINUOUSLY
VARIABLE FOCAL LENGTH
Vilém Smejkal, Prerov, and Ladislav Pospíšil, Veselicko,
Czechoslovakia, assignors to Meopta, narodni podnik,
Prerov, Czechoslovakia
Filed Oct. 12, 1962, Ser. No. 230,233
Claims priority, application Czechoslovakia, Oct. 16, 1961,
6,111/61
5 Claims. (Cl. 88—57)

The present invention relates to a projection objective of continuously variable focal length consisting of an axially movable convergent or positive component interposed between a stationary convergent rear component and a stationary divergent front component, variation of the focal length being effected by axially moving the middle convergent member.

Exact maintainance of a constant position of one of two conjugate planes, that is, the focal plane either of the object or of the image is desired for various applications. It can be achieved by two known methods. In one known method, two members of the lens system move differently so that movement by the first member produces the principal variation of focal length while movement of the second member causes precise adjustment of the image on the image plane. In the other method two or more members move in the same manner between stationary members.

It is not a necessary feature of projection objectives of continuously variable focal length that the size of the image projected on a screen be changed without any refocusing. Such a feature would lead to greater mechanical or optical complexity of the objective and it could not be fully utilized because of the slight deformation of the projected film in the direction of the optical axis which is caused by a plurality of interrelated factors and requires sharpness of the screen image to be restored from time to time by focusing. Moreover, the distance between the screen and projector is variable where the projector is portable so that the objective must be refocused whenever the projector is used.

Projection objectives of continuously variable focal length are therefore adequate if the backfocus on the film side varies not more than 10% over the full range of focal lengths, and maximum image quality and maximum relative aperture of the objective are most important.

It is an object of the present invention to provide a projection objective of continuously variable focal length designed in accordance with the foregoing principles.

The projection objective of the present invention has a continuously variable focal length and includes an axially movable convergent component coaxially interposed between a stationary convergent rear component on the film side and a stationary divergent front component. The focal length of the front component exceeds the focal length of any of the two other components, and the ratio of the focal length of the movable component to the focal length of the rear component is between 1.8 and 0.8.

The front component of the objective of the invention is a divergent air-spaced doublet consisting of a converging rear element and a diverging front element, the refractive index $n_D$ of the diverging element being smaller by at least 0.12 than that of the converging lens element, and at least one surface thereof of negative refractive power having a radius of curvature smaller than 0.6 times the focal length of the front component.

The middle component of the objective is a cemented achromatic doublet having a converging and a diverging element, the cemented surface thereof having negative refractivity and the refractive index $n_D$ of the converging lens element thereof being higher than 1.58. The middle member may also consist of two achromatic converging elements or of a single converging element and an achromatic converging element, at least one of the two converging elements having an Abbé number higher than 58.

Mechanical assembly of the objective of the invention is very simple because of the movable arrangement of the single middle optical member.

A projection objective of continuously variable focal length according to the present invention will now be described by a numerical example with reference to the accompanying drawing.

The reference characters of the drawing and in the following Table I have the following meaning:

$s$ is the backfocus on the film side;
$F'$ is the position of the focus;
$o$ is the optical axis of the system;
$a$ is an aperture beam for the centre of the field at a relative aperture 1:1.5, the arrows indicating the direction of the aperture beam;
R is a radius of curvature;
$d$ is the thickness of a lens element;
$l$ is the size of an air gap;
$n_D$ is the refractive index for the line D of the spectral;
$v$ is the Abbé number;
I is the front stationary component of the lens system;
II is the middle movable component of the system;
III is the rear stationary component of the system.

Table I

|  |  | $n_D$ | $v$ |
|---|---|---|---|
| $R_1=-24.0$ | $d_1=1.0$ | 1.51633 | 64.0 |
| $R_2=+40.0$ | $l_1=1.0$ |  |  |
| $R_3=+49.34$ |  |  |  |
| $R_4=-175.4$ | $d_2=3.0$ | 1.64831 | 33.8 |
|  | $l_2=21-l_3$ |  |  |
| $R_5=+51.87$ | $d_3=1.0$ | 1.76182 | 26.5 |
| $R_6=+21.6$ |  |  |  |
| $R_7=-40.0$ | $d_4=6.0$ | 1.65832 | 57.1 |
|  | $l_3=21-l_2$ |  |  |
| $R_8=+17.0$ | $d_5=4.0$ | 1.65832 | 57.1 |
| $R_9=-240.0$ | $l_4=1.5$ |  |  |
| $R_{10}=-30.71$ | $d_6=1.0$ | 1.64831 | 33.8 |
| $R_{11}=+19.0$ | $l_5=1.0$ |  |  |
| $R_{12}=+27.0$ | $d_7=7.5$ | 1.65832 | 57.1 |
| $R_{13}=-29.6$ |  |  |  |

Radii thicknesses, and air or gaps are given in millimeters.

The focal lengths of the three optical components may be computed from Table I as follows:

$f_I = -59.54$ mm.
$f_{II} = +38.96$ mm.
$f_{III} = +30.82$ mm.

The total focal length $f$ of the system and the backfocus on the film side depend on the position of the middle member as shown in the following table:

Table II

| $l_1$ | $l_3$ | $f$ | $S'$ |
|---|---|---|---|
| 1 | 21 | 25.87 | 13.53 |
| 11 | 11 | 19.96 | 13.18 |
| 21 | 1 | 15.54 | 13.42 |

All values are in millimeters. As is evident from the table, the small variation of the backfocus is satisfactory.

The projection objective of the invention is especially advantageous for use in portable projectors. The objective according to the numerical example is designed for 8 mm. projectors and its ratio of focal length variation is 1:1.66.

Those skilled in the art will readily modify the projection objective of the invention in the light of the above teachings without departing from the spirit and scope of the appended claims.

What we claim is:

1. A projection lens system of continuously variable focal length comprising, in combination:
   (a) a fixed negative front component,
      (1) said front component being an air spaced doublet including a divergent lens as a front element and a convergent lens,
      (2) the refractive index $n_D$ of said divergent lens being smaller than the corresponding refractive index of said convergent lens by at least 0.12,
      (3) the first radius of curvature of said divergent lens being smaller than 0.6 times the numerical value of the focal length of said front component;
   (b) a fixed positive rear component axially spaced from said front component,
      (1) said rear component having two convergent outer lenses and a divergent lens interposed between said outer lenses, said lenses of said rear component being air spaced elements; and
   (c) an achromatic positive component coaxially movably interposed between said front and rear components,
      (1) said achromatic component being a cemented doublet having a divergent front element and a convergent rear element,
      (2) the numerical value of the focal length of said front component being greater than the focal length of said rear component and greater than the focal length of said achromatic component, and
      (3) the ratio of the focal length of said achromatic component to the focal length of said rear component being between 1.8 and 0.8.

2. A lens system as set forth in claim 1, wherein said achromatic component has a cemented surface of negative refractivity.

3. A lens system as set forth in claim 2, wherein the refractive index $n_D$ of said convergent element is above 1.58.

4. A lens system as set forth in claim 1, wherein the radii of curvature of said air-spaced doublet, of said cemented doublet, and of the three air spaced elements of said rear component substantially are, in sequence from front to rear, −24.0, +40.0, +49.3, −175.4, +51.87, +21.6, −40.0, +17.0, −240.0, −30.71, +19.0, +27.0, and −29.6; the thicknesses of the elements in said air-spaced doublet, said cemented doublet, and said rear component substantially are, in said sequence 1.0, 3.0, 1.0, 6.0, 4.0, 1.0, and 7.5; and the axial dimension of the air spaces in said air-spaced doublet, between said doublets, between said cemented doublet and said rear component, and in said rear component substantially are, in said sequence, 1.0, 21 to 1, 1 to 21, 1.5, and 1.0, said radii, said thicknesses, and said air spaces being expressed in identical units of length; the indices of refraction $n_D$ of said elements substantially being, in said sequence, 1.51633, 1.64831, 1.76182, 1.65832, 1.65832, 1.64831, and 1.65832; and the Abbé numbers of said elements substantially being, in said sequence, 64.0, 33.8, 26.5, 57.1, 57.1, 33.8, and 57.1.

5. A lens system as set forth in claim 4, wherein said units are millimeters.

References Cited by the Examiner

UNITED STATES PATENTS

| | | | |
|---|---|---|---|
| 696,788 | 4/1902 | Allen | 88—57 |
| 2,165,341 | 7/1939 | Capstaff et al. | 88—57 |
| 2,784,644 | 3/1957 | Bednarz | 88—57 |
| 3,023,673 | 3/1962 | Cox et al. | 88—57 |

JEWELL H. PEDERSEN, *Primary Examiner.*

JOHN K. CORBIN, *Examiner.*

R. STERN, *Assistant Examiner.*